Dec. 1, 1925.  1,563,447
H. E. SIMONTON
ANTISLIPPING DEVICE FOR MOTOR VEHICLES
Filed Oct. 2, 1924
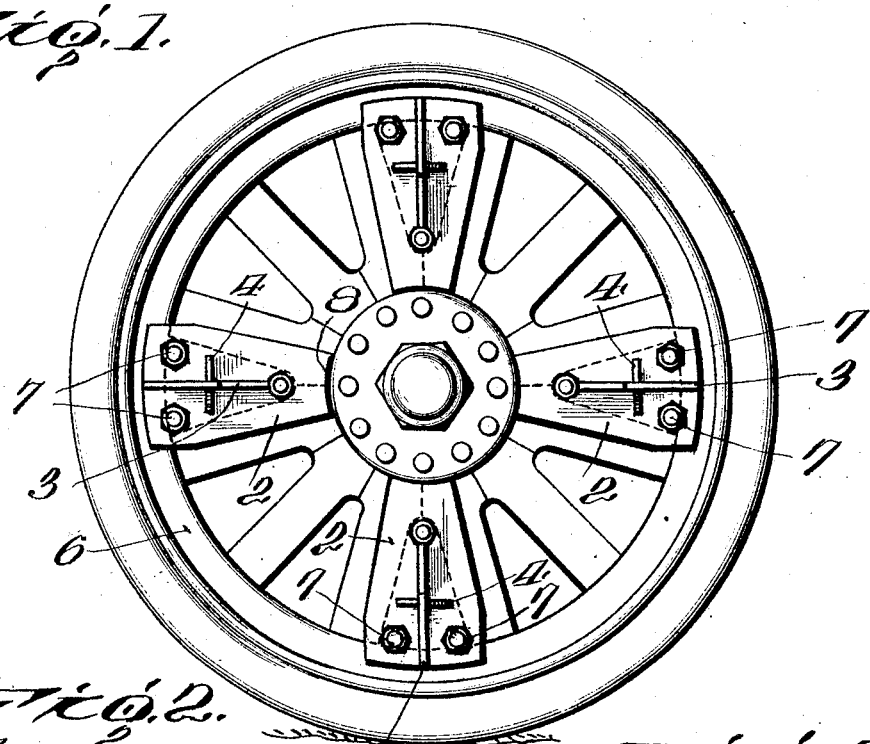
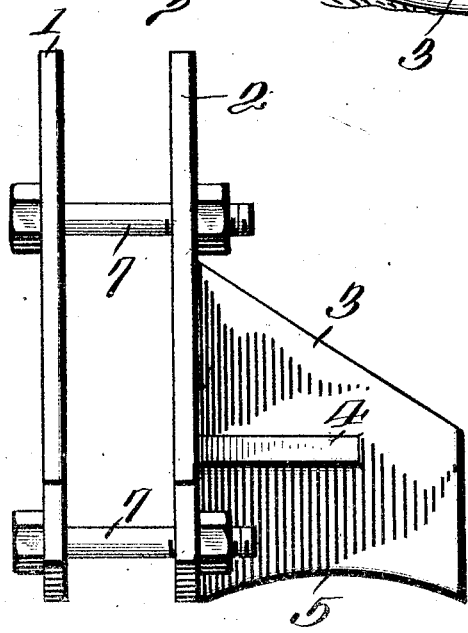
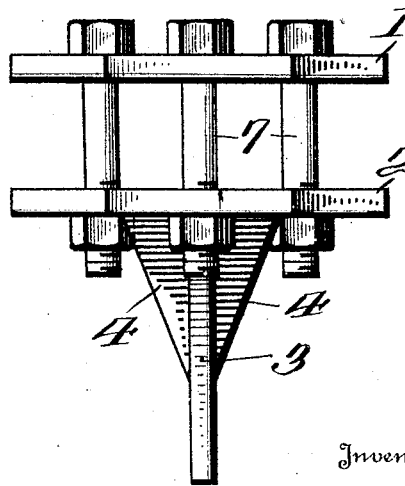
Inventor
H. E. SIMONTON.
By
Attorney Patented Dec. 1, 1925.

1,563,447

UNITED STATES PATENT OFFICE.

HUGH ERNEST SIMONTON, OF MEMPHIS, TENNESSEE.

ANTISLIPPING DEVICE FOR MOTOR VEHICLES.

Application filed October 2, 1924. Serial No. 741,144.

*To all whom it may concern:*

Be it known that I, HUGH ERNEST SIMONTON, a citizen of the United States, residing at Memphis, in the county of Shelby and State of Tennessee, have invented certain new and useful Improvements in Antislipping Devices for Motor Vehicles, of which the following is a specification, reference being had therein to the accompanying drawing.

This invention relates to certain new and useful improvements in an anti-slipping device for motor vehicles, the object being to provide a device which can be readily attached to the driving wheels of a motor vehicle, such as an automobile or truck so that when traveling over muddy roads, the wheels will be prevented from slipping, thereby obtaining traction under all conditions of roads.

Another object of my invention is to provide an anti-slipping device which is so constructed that when the device is in position on the wheel and the motor vehicle drops into a mud hole, the device can be used by placing a pole in the mud hole to obtain traction so as to propel the vehicle out of the hole.

A further object of the invention is to provide an anti-slipping device which is mounted in such a position on the wheels that the anti-slipping device, when traveling on hard roads, is above the surface of the road so as not to interfere with the traveling of the vehicle, the blades of the device being so positioned that when traveling in soft earth, they will imbed themselves in the soft earth to obtain traction for the motor vehicle.

Other and further objects and advantages of the invention will be hereinafter set forth and the novel features thereof defined by the appended claims.

In the drawings,

Figure 1 is a side elevation of a wheel showing the application of my improved construction of anti-slipping device;

Figure 2 is an edge elevation of the device detached; and

Figure 3 is a plan view of the inner end of the device.

In carrying out my invention I employ a pair of plates 1 and 2, said plate 2 being provided with outwardly extending blades 3 provided with braces 4 and curved lower edges 5. These plates are adapted to be secured in position on a wheel 6 as shown in Figure 1 by bolts 7, which extend through suitable openings formed in the plates so as to securely lock the plates in position on the wheel.

The inner edges of the plates are curved as shown at 8 to fit the hub and the outer edges are curved as shown at 9 to engage the rim of the wheel, the bolts passing through the plates between the spokes of the wheel as clearly shown.

In the construction as herein shown the plate 2 is a cast metal plate with blades 3 and webs 4 formed integral therewith, but it is, of course, understood that this plate can be of sheet metal, and the blades struck up therefrom or the blades can be formed separate and connected to the plates by the braces 4 and therefore I do not wish to limit myself to any particular manner of constructing the plate with the blades.

In practice I secure four of the devices to each of the rear wheels of a motor vehicle so that when the motor vehicle is traveling on a soft road, the plates will imbed themselves in the earth so as to obtain traction for the motor vehicle, which prevents the rear wheel from slipping and skidding.

By forming the edges of the blades curved as shown at 5, when the vehicle has dropped into a mud hole and becomes stuck, by placing a pole in the mud hole alongside of the wheels, the plates will ride on the pole, the pole acting as a track so that the vehicle will be propelled out of the hole by its own power.

I am aware that I am not the first in the art to secure a blade to a wheel of a motor vehicle for preventing the same from slipping but with prior constructions of devices of this character, it is impossible to obtain the same result as obtained with the construction of non-slipping device as herein shown and described, as I provide means for allowing the wheel to ride on a rail in order to propel the vehicle out of an exceedingly soft hole.

From the foregoing description it will be seen that I have provided an anti-slipping device for a traction wheel of a motor vehicle, wherein a series of blades are attached to the wheel in such a manner that when the wheel sinks below a certain distance in a soft road, the blades imbed themselves in the earth to obtain traction in order to propel the vehicle without allowing the wheels to slip.

While I have shown and described a device composed of mud fans to be attached to the rear wheels of a motor vehicle using a spoke wheel, it is, of course, understood that I do not wish to limit myself to the construction of this device in any particular manner as various changes can be made so that the device can be attached to any style of spoke wheel, disk wheel or wire wheel without departing from the spirit of my invention.

What I claim is:—

1. A device of the kind described comprising a pair of plates adapted to be secured to the wheel of the motor vehicle, one of said plates being provided with an outwardly extending blade having its outer edge terminating inside the tire of the wheel.

2. A device of the kind described comprising a pair of plates adapted to be attached to the wheel of a motor vehicle, one of said plates having an outwardly extending blade provided with a concaved outer edge terminating inside the tire of the wheel.

3. A device of the kind described comprising a pair of plates, said plates being adapted to be arranged upon opposite sides of the wheel of a motor vehicle, bolts extending through said spokes for connecting said plates to said wheel, one of said plates being provided with an outwardly extending blade connected to said plate by braces.

In testimony whereof I hereunto affix my signature.

HUGH ERNEST SIMONTON.